United States Patent
Grandas (10) Patent No.: US 7,740,007 B2
(45) Date of Patent: Jun. 22, 2010

(54) ALTERNATIVE LEFT/RIGHT BANK EGR LOOP OPERATION TO IMPROVE FOULING RESISTANCE DURING LOW MASS FLOW ENGINE MODE

(75) Inventor: Joseph Grandas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 935 days.

(21) Appl. No.: 11/470,987

(22) Filed: Sep. 7, 2006

(65) Prior Publication Data

US 2008/0060624 A1    Mar. 13, 2008

(51) Int. Cl.
F02M 25/07    (2006.01)

(52) U.S. Cl. ................................. 123/568.12

(58) Field of Classification Search ............ 123/568.12, 123/586.2, 568.21, 568.23, 568.24, 568.25
See application file for complete search history.

(56) References Cited

U.S. PATENT DOCUMENTS

| 5,562,086 | A * | 10/1996 | Asada et al. ............ 123/568.21 |
| 6,758,185 | B2 | 7/2004 | Surnilla et al. |
| 6,904,898 | B1 * | 6/2005 | Sahlen ................... 123/568.12 |
| 6,917,873 | B2 * | 7/2005 | Itoyama ................. 123/568.12 |
| 7,080,635 | B2 * | 7/2006 | Sato ...................... 123/568.12 |
| 7,107,761 | B2 * | 9/2006 | Fukuma et al. ........ 123/568.21 |
| 2005/0028515 | A1 | 2/2005 | Fukuma et al. |
| 2007/0028901 | A1 * | 2/2007 | Watakabe et al. ...... 123/568.12 |

FOREIGN PATENT DOCUMENTS

| EP | 1420159 | 5/2004 |
| WO | 2006/096346 | 9/2006 |

* cited by examiner

Primary Examiner—Stephen K Cronin
Assistant Examiner—Arnold Castro
(74) Attorney, Agent, or Firm—Julia Voutyras; Alleman Hall McCoy Russell & Tuttle LLP (57) ABSTRACT

A system for a vehicle, comprising of a diesel engine having an intake system and an exhaust system, a first EGR loop coupled between said intake system and said exhaust system and having a first valve and a first cooler located therein, a second EGR loop coupled between said intake system and said exhaust system and having a second valve and a second cooler located therein, and a control system operating the first and second valves in a first condition where both valves provide EGR flow to the engine, and at least temporarily increasing flow in the first EGR loop and decreasing flow in the second EGR loop when EGR flow is decreased to a condition where buildup in one of said coolers is increased.

18 Claims, 6 Drawing Sheets

ALTERNATIVE LEFT/RIGHT BANK EGR LOOP OPERATION TO IMPROVE FOULING RESISTANCE DURING LOW MASS FLOW ENGINE MODE

FIELD

The present application relates to system and method to reduce the build up of particulates in EGR coolers of a diesel engine.

BACKGROUND AND SUMMARY

Exhaust gas recirculation (EGR) systems may be used in diesel internal combustion engines to reduce NOx emissions. In the combustion chambers, the recirculated exhaust gas acts as an inert gas, thus lowering the flame and in-cylinder gas temperature and decreasing the formation of NOx. Further, EGR systems may include coolers to cool the exhaust gas before it is introduced into an intake manifold of a diesel engine.

One approach to utilize multiple EGR loops is described in U.S. 2005/0028515. In this system, an exhaust control apparatus is applied to an internal combustion engine in which intake sides of a plurality of cylinder groups are connected to a common intake passage and exhaust sides thereof are connected to different exhaust passages. The system includes an exhaust gas flow amount adjusting device for causing a flow amount of exhaust gas, which is discharged through each of the exhaust passages of the cylinder groups, to be changed, an exhaust gas flow amount difference estimating device for estimating a difference in an exhaust gas flow amount between the exhaust passages of the cylinder groups, and an exhaust gas flow amount control device for controlling the exhaust gas flow amount adjusting device so as to reduce the estimated difference in the exhaust gas flow amount.

However, the inventors herein have recognized a disadvantage with such an approach. In particular, at low mass EGR flows and/or low EGR gas temperatures, solids such as soot, lacquer, tar, etc. may build up in the EGR cooler over a period of time. This build up can reduce gas flow, increase pressure drop, and reduces cooling efficiency.

The above issue may be solved by a system for a vehicle having a diesel engine with multiple EGR loops, where a control system is provided to adjust operation of valves in the EGR loops in a first condition where both valves provide EGR flow to the engine, and then at least temporarily increase flow in the first EGR loop and decrease flow in the second EGR loop when EGR flow is decreased to a condition where buildup in one of said coolers is increased. In this way, the buildup in the loop having increased flow can be reduced via the increased flow rate, flow velocity, and/or temperature, and the buildup in the second loop can be reduced by reducing the amount of flow, or possibly reduced by stopping the flow. Further, by coordinating the adjustments in this way, the engine can still receive the desired total amount of EGR flow dictated via the current operating conditions.

In addition, by selective placement of EGR inlets and/or outlets, sufficient mixing of EGR with fresh air may be provided. For example, one or more EGR inlets may be position in an intake manifold upstream of a split of flow to separate cylinder groups or banks.

In an alternative approach, the above issues may be addressed by a method of operating an engine having a first exhaust gas recirculation loop and second exhaust gas recirculation loop, the loops having respectively a first and second valve located therein and a first and second cooler located therein. The method comprises during a first condition, operating with both the first and second valves providing at least some flow; and during a second condition, operating with the first valve providing more flow to the first cooler than during said first condition and the second valve providing less flow to the second cooler than during said first condition.

Note that the above examples may include various modifications. For example, more than two EGR loops may be provided, and the loops may be provided in different relative locations, such as one loop being operated at a higher pressure level than the other due to turbocharger operation.

Further, it may be possible to alternate the operation of the EGR loops during the second condition, for example, to provide even aging and buildup reduction of the loops and engine cylinders, for example. However, if one loop is more prone to build up, that loop can be operated proportionally more often, or longer, with the higher flow.

Further still variations may also be used as described in more detail herein.

DETAILED DESCRIPTION

Figure 1A:
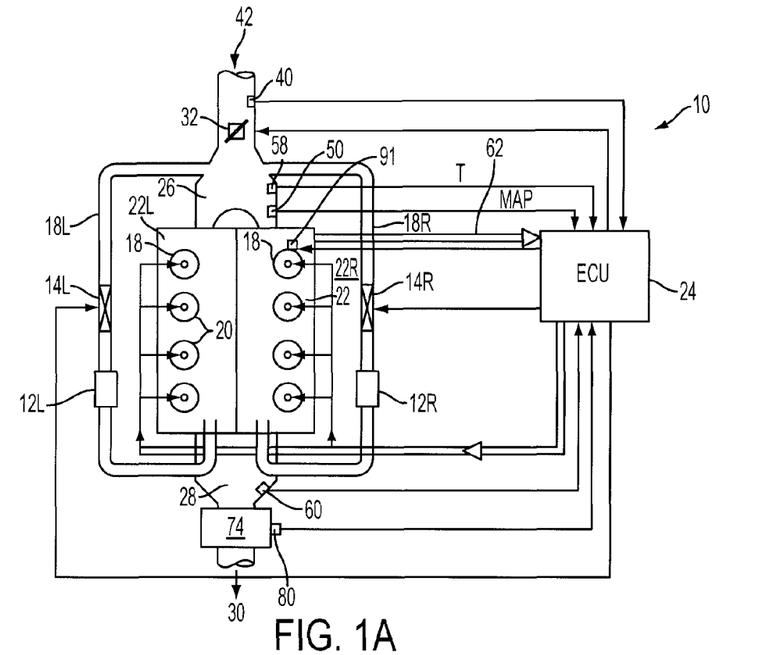
FIGS. 1A and 1B are schematic diagrams of examples diesel engines.

FIG. 1A is a schematic diagram of a diesel engine system 10. A representative engine block 16 is shown having eight cylinders 18 with four cylinders disposed in the left bank 22L and four cylinders disposed in the right bank 22R, although more or fewer cylinders may be used if desired. While FIG. 1A shows a configuration with two banks in a left/right configuration, the engine may be configured in a variety of ways, and cylinders may be grouped in a variety of ways. For example, an inline engine may be used, such as an I-6, where three cylinders are in a first group and a different three cylinders are in a second group, where each group may have a separate or common intake and/or exhaust manifolds or sections.

Each of the cylinder or combustion chambers 18 may include a direct-injection fuel injector 20. For example, a common rail system may be used to deliver fuel to the cylinders. The duty cycle of the fuel injectors 20 may be determined by the engine control unit (ECU) 24. Air enters the combustion chambers 18 through the intake manifold 26, and combustion gases are exhausted through the exhaust manifold 28 in the direction of arrow 30.

In the depicted embodiment, the intake valves and exhaust valves (not shown) may be actuated by variable cam timing (VCT) 91. In some examples, variable valve lift (VVL), cam profile switch (CPS), among other valve control systems may be used to adjust operation of one or more of the intake and/or exhaust valves. Alternatively, electric valve actuators (EVA) may be used to control operation of intake and exhaust valves, respectively. Each valve may be configured with a valve position sensor (not shown) that can be used to determine the position of the valve.

To reduce the level of NOx emissions, the engine may be equipped with an EGR system 18. The diesel engine system 10 may be equipped with an exhaust gas recirculation (EGR) system having at least two loops, such as 18L and 18R associated with left bank 22L and right bank 22R, respectively. Specifically, in this example, EGR system 18 comprises a left EGR loop 18L recirculating the exhaust gas substantially from the left bank 22L of cylinders to the intake manifold 26, and a right EGR loop 18R recirculating the exhaust gas substantially from the right bank 22R of cylinders to the intake manifold 26. Alternatively, each EGR loop may recirculate exhaust gas from multiple cylinder groups.

In the example of FIG. 1A, each EGR loop includes a control valve, such as EGR valves 14L and 14R, which regulate the amount of exhaust gas recirculated from the exhaust. The valves 14L and 14R may be a throttle plate, pintle-orifice, slide valve, or any other type of variable valve. Further, EGR coolers 12L and 12R are disposed in the left and right EGR loops to cool down the exhaust gas from the engine banks. While this example shows both loops including a cooler, in an alternative embodiment less than all of the loops may include a cooler, for example, only one loop may include a cooler.

In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture by reducing excess oxygen.

Note that a turbo charger can be included in the engine systems illustrated herein. The turbo charger can increase exhaust pressure to allow for increased EGR flow. Further, in the turbocharger example, both high pressure and low pressure EGR systems may be used. As such, the engine may have two EGR loops, one being a high pressure loop (EGR being drawn from upstream of the turbine) and one being a low pressure loop (EGR being drawn from downstream of the turbine).

An aftertreatment device 74 may also be disposed downstream of the exhausat manifold 28. Aftertreatment device 74 may include any suitable type of device for reducing emissions from engine 10. Examples include, but are not limitied to, three-way catalytic converters, NOx traps, oxidation catalyst, particulate filters, SCR catalysts, lean NOx catalyst, etc. In one embodiment, one or more pressure and/or temperature sensors 80 may be coupled in system 74, and used to adjust engine operation.

All of the engine systems, including the EGR systems 18, throttle valves 32, and fuel injectors 20 may be controlled by the ECU, which is represented as a single controller. However, multiple controllers, which may communicate via a CAN, may be used. In one example, signals from the ECU 24 regulate the EGR valve positions based on operating conditions as described herein.

For example, in the ECU 24, the command signals to the EGR system 18 as well as other command signals, may be calculated from or adjusted based on measured variables and engine operating parameters. Sensors and calibratable lookup tables may provide the ECU 24 with engine operating information. For example, manifold absolute pressure (MAP) sensor 50 provides a signal to the ECU 24 indicative of the pressure in the intake manifold 26 downstream of the EGR entrance. Further, an air charge temperature sensor 58 provides a signal to the ECU 24 indicative of the temperature of the intake air charge 42. A mass airflow (MAF) sensor 40 also provides signals indicative of the airflow in the intake system to the ECU 24.

In addition, exhaust gas oxygen concentration, which can be indicative of air-fuel ratio, can be provided by oxygen sensor 60. Additional sensory inputs can also be received by the ECU along signal line 62 such as engine coolant temperature, engine speed, and throttle position, for example.

Figure 1B:
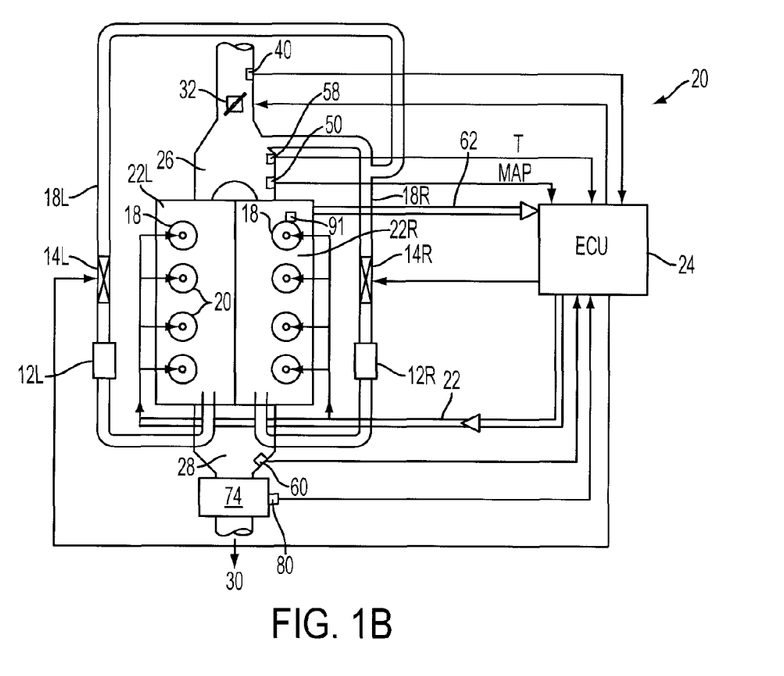

Referring now to FIG. 1B, an alternative simplified schematic diagram of a diesel engine system 20 is shown. The engine system 20 is similar to the engine system 10 and the same reference numbers in FIG. 1B represent the same components as in FIG. 1A. However, in the system of FIG. 1B, various differences are present. For example, one end of the left EGR loop 18L is connected to the end of the right EGR loop 18R which is coupled into the intake manifold 26. Thus, a single entry of EGR gasses into the intake manifold is provided, although the EGR is drawn from multiple locations in the exhaust. In still another alternative, a single exhaust location may be used to draw EGR gases, which are then delivered to multilple intkake manifold entry locations, controlled by separate valves, for example.

In both engine systems in FIGS. 1A and 1B, the EGR entry location(s) may be selected to provide sufficient mixing of exhaust gas with fresh air before combustion.

FIGS. 1A and 1B merely show example multi-cylinder engines, and each cylinder has its own set of intake/exhaust valves, fuel injectors, etc. The depicted diesel engines 10 and 20 are shown for the purpose of example, and that the systems and methods described herein may be implemented in or applied to other suitable diesel engines having different arrangements, such as those noted herein.

In some operating conditions, the EGR coolers may become fouled (via internal build up of soot, lacquer, tar, etc.) over a period of operation. This build up can reduce gas flow (increase pressure drop), and thus reduce cooling efficiency. Further, prolonged periods of steady state conditions at low mass flows tend to continue to build up over time.

Figure 2:
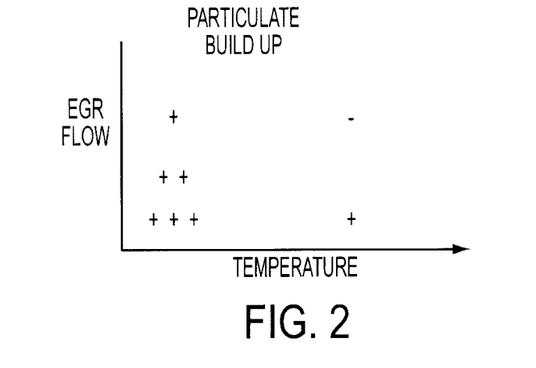
FIG. 2 is a schematic graph illustrating a correlation of particulate build up with the EGR flow and EGR temperature.

FIG. 2 is a schematic graph illustrating an example qualitative correlation of solid build up in an EGR cooler with the EGR flow and EGR temperature. As the flow rate in the EGR system becomes low, the solid particulates such as soot, lacquer, and tar in the exhaust may separate from the flow and precipitate in the EGR coolers. Likewise, low temperature tends to enhance the build up. At low temperature, some gaseous constitutes such as water vapor may condense into liquids, which may accumulate on particulates and enlarge particulates, thus increasing the build up in the cooler. As shown in FIG. 2, there may be increased build up as indicated by the (+'s) at lower EGR flow rates and lower temperatures while there is no or reduced build up as indicated by the (−'s) at higher EGR flow rates and higher temperatures.

One approach to address this build-up is to toggle or vary EGR flow through multiple EGR loops to increase total flow through one loop thus increasing flow velocity and in turn reducing the build up rate for that loop.

Figure 3:
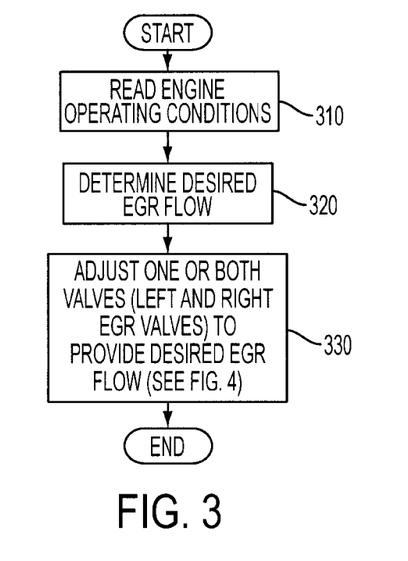
FIG. 3 is a high level flow diagram of one embodiment of a method to control EGR loop operation.

One approach is illustrated in FIG. 3. Specifically, FIG. 3 is a high level flow diagram of one embodiment of a method to reduce the build up and/or clean the particulates in the EGR loops and/or coolers. The routine first reads the engine operating conditions in 310. The engine operation conditions may include engine speed, load, temperature, etc., which may be used to determine desired total EGR flow from multiple EGR loops, such as from a first and second bank of the engine in 320. Next, the routine, in 330, adjusts EGR valve position(s) in one or more EGR loops to provide the total desired EGR flow, as well as the desired amount of EGR flow for the individual loops. For example, one or more EGR valves may be adjusted in a manner so that flow in one or more EGR loops is maintained at a level that reduces the build up of solids in the EGR cooler or clean the EGR cooler. The adjustments of the EGR valve may be based on the desired EGR flow at specific engine conditions.

Before continuing with additional control routines, further details of potential interaction among one or more EGR loops are illustrated. Specifically, referring to FIG. 4, example schematic relationships of EGR flow at maximum EGR valve openings is shown as a function of manifold absolute pressure. Line 1 shows the relationship of EGR flow in a first EGR loop with the manifold absolute pressure (MAP). Line 2 shows the relationship of total EGR flow in both a first and second EGR loop with MAP. The lines are prophetic examples assuming both EGR loops have similar physical flow properties. Further, while this example shows a first and second loop, additional loops may also be used.

Figure 4:
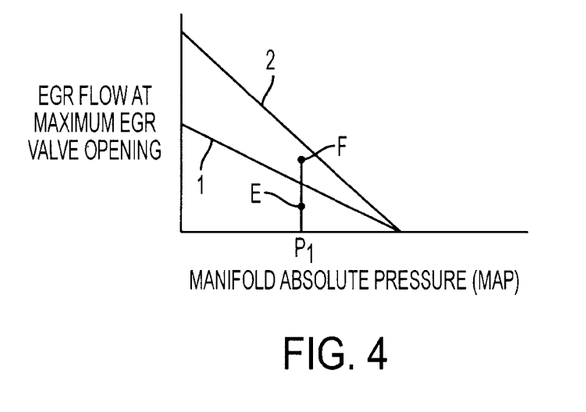
FIG. 4 shows the relationships of EGR flow at the maximum EGR valve opening as a function of manifold absolute pressure.

Points E and F indicate desired EGR flows at specific engine operating conditions. At point E, the desired flow is less than the maximum EGR flow of one EGR loop at pressure P1. Under this condition, EGR flow from one EGR loop can be sufficient to provide the desired EGR flow. Alternatively, both a first valve in the first loop and a second valve in the second loop may be set to relatively low openings. And still further alternatives are also available, such as unequal flow between the first and second loops.

At point F, the desired flow is greater than the maximum EGR flow of one EGR loop at pressure P1. Under this condition, both EGR valve may be set at least partially open to provide the desired EGR flow. For example, a first valve in the first loop may be set to a maximum opening, and a second valve in the second loop may be set to a substantially midpoint opening. Alternatively, both a first valve in the first loop and a second valve in the second loop may be set to high openings.

To reduce the solid build up in an EGR cooler at low EGR flow, one strategy increases the EGR flow in a first EGR loop and reduces (or completely stops) EGR flow in a second EGR loop. Higher EGR flow may be used to reduce the precipitation of solid in the EGR system. For example, the loop with reduced or no flow may have reduced build up, and similarly the loop with increased flow may have reduced build up. Thus, at least one, and possibly both loops, can be operated with less build up.

However, under some conditions such as the point F in FIG. 4, operation of both EGR loops may be used to provide the desired flow. Under these conditions, both EGR valves may be adjusted to provide the desired EGR flow, and the increase of one loop and corresponding decrease of another group may at least reduce buildup in one of the loops.

Figure 5A:
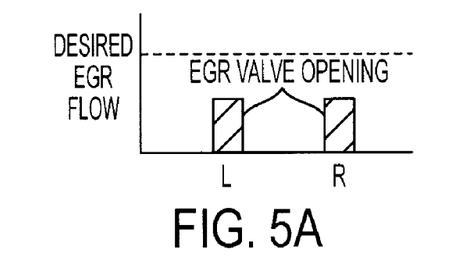
FIGS. 5A, 5B, and 5C show schematic graphs of desired EGR flow versus opening of EGR valves in the left and right EGR banks.
Figure 5B:
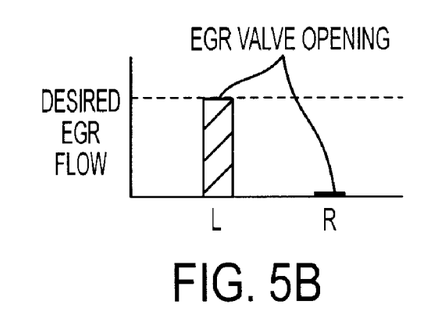
Figure 5C:
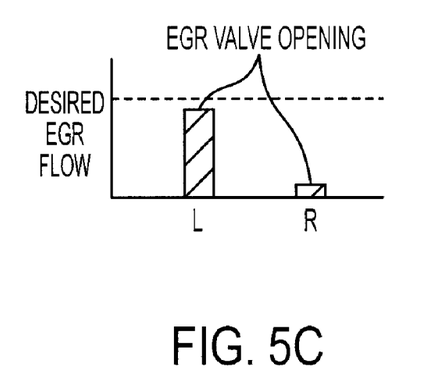

FIGS. 5A, 5B, and 5C show schematic graphs of desired EGR flow versus opening of EGR valves in a first and second EGR loop, such as the left and right EGR loops of FIG. 1. Specifically, FIG. 5A shows that both EGR valves are open at substantially the same degree to provide a desired flow (dashed line). Such operation may be performed with EGR control so that the exhaust gas in the intake manifold may be evenly distributed. However, there may be some variation between the two loops to account for bank-to-bank differences such as mixing, temperature, etc. The strategy described in FIG. 5A may be referred to as a first EGR flow mode (Mode A).

FIG. 5B shows that one EGR valve (e.g., the left EGR valve) is open to provide the desired flow and another EGR valve (e.g., right EGR valve) is closed. Thus, at a lower EGR flow condition, the flow in one EGR loop is increased to reduce the build up of solids in the cooler while the flow in another EGR loop is substantially stopped and thus a reduced amount of solid materials is introduced to both loops during this operation. Further, the valves may be alternated between the flow/no flow conditions in response to cooler temperature, EGR mixing requirements, etc. The strategy described in FIG. 5B may be referred to as a second EGR flow mode (Mode B).

FIG. 5C shows that one EGR valve may be adjusted to provide higher flow and another EGR valve may be adjusted to provide lower flow, for example where the higher flow is a maximum amount of flow for given operating conditions. Again, the valves may be alternated between the higher/lower flow conditions in response to cooler temperature, EGR mixing requirements, etc. For example, where the lower flow condition may be in a range where cooler build up still occurs at a greater than desired amount, the valves may alternate in flow amounts to enable periodic higher flow conditions in each loop to help reduce the build up. The strategy described in FIG. 5C may be referred to as a third EGR flow mode (Mode C).

Figure 6:
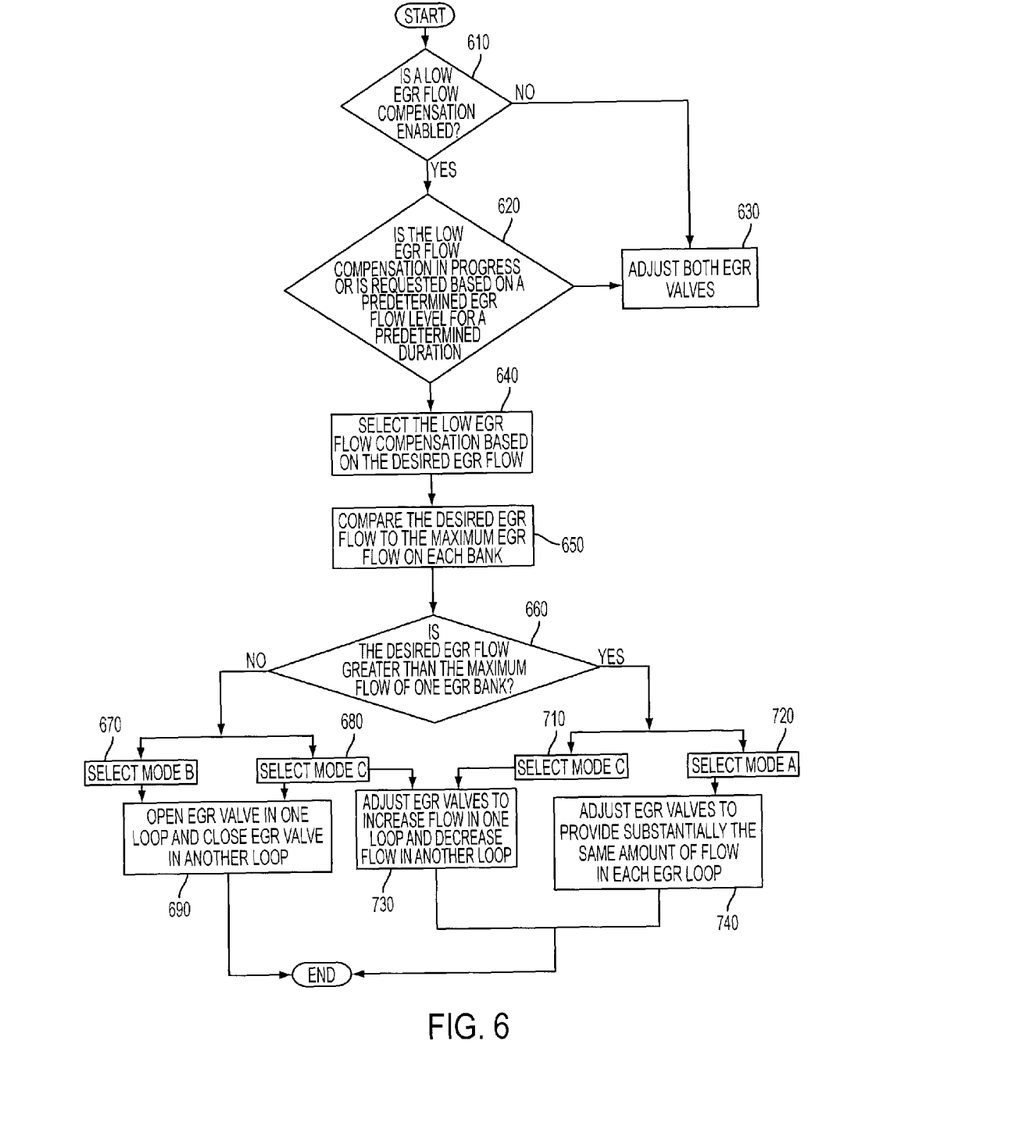
FIG. 6 is a flow diagram of one embodiment of a method to operate the EGR systems at low EGR flow.

Referring now to FIG. 6, it shows a flow diagram of one embodiment of a method to operate the EGR systems at EGR flow conditions where build up, such as in an EGR cooler, may be an issue. The routine first determines if low EGR flow compensation is enabled in 610. The control may be enabled based on various conditions, such as a number of engine revolutions or amount of operation from a previous build-up reduction operation. Further, the control may be enabled based on a time since engine start, engine coolant temperature, and various others. If the answer is no, the routine, in 630, adjusts EGR valves in both EGR loops based on the desired EGR flow. For example, the EGR valves may be controlled to provide substantially similar flow levels, or similar valve positions. In some engine configurations, the balanced flows from both EGR loops may provide desired mixing in the intake manifold.

Next, the routine, in 620, determines if the low EGR flow compensation is in progress or is requested based on whether EGR flow in one or more loops is below a predetermined EGR flow level for a predetermined duration, for example. As described above, solids may build up in an EGR cooler at low flow rates and/or temperatures. The predetermined flow level may be a threshold below which build-up occurs. In some conditions, prolonged periods of steady state conditions at low mass flow may cause the build up. Thus, an EGR flow rate threshold and/or duration of the flow rate may be used to determine the need for a cleaning cycle and/or compensation to reduce the build up. For example, when the total EGR flow amount falls below a threshold value, EGR compensation may be requested. Likewise, when the EGR flow amount of one of the loops falls below a threshold value, EGR compensation may be requested.

Additionally, in some embodiments, the exhaust temperature may be used to trigger the low EGR flow compensation. In still another embodiment, compensation may be provided to adjust the EGR flow amounts unequally between a plurality of EGR loops at periodic intervals.

If the answer to 620 is no, the routine again proceeds to 630. If the answer is yes, the routine continues to 640 where the routine selects the compensation for the low EGR flow operation. For example, the routine may select a duration, amount, and/or type of compensation to reduce buildup.

Next, the routine, in 650, compares the desired EGR flow to the maximum EGR flow possible in one EGR loop (e.g., in one of the banks in one example) for the current operating conditions. The desired EGR flow and system capabilities may be used to determine the compensation of EGR operation at low EGR flow as described in FIG. 4, for example.

Next, the routine, in 660, determines if the desired EGR flow is greater than the maximum flow of one EGR loop. If the answer is no, the routine, in 670, selects Mode B for low EGR flow compensation in which the EGR flow is increased in one loop and decreased (stopped) in the other loop. Specifically, the routine, in 690, increases opening of the EGR valve in one EGR loop and reduces (e.g., closes) the opening of the EGR valve in another loop. Optionally, the routine, in 680, may select an alternative operation, such as Mode C, for example. In this case, the routine, in 730, adjusts the EGR valves to increase EGR flow in one loop and decrease EGR flow in another loop. In this way, the buildup in at least one, and possibly more than one, EGR loop may be reduced.

If the answer to 660 is yes, the routine, in 710, selects Mode A or in 720 selects mode C for the low EGR flow operation. Under this condition, both EGR valves are adjusted so that at least two loops are used to supply the desired EGR flow (equally or un-equally). From 710, the routine, in 730, adjusts the EGR valves to increase EGR flow in one loop and decrease flow in another loop. As noted herein, the procedure may be alternated between multiple EGR loops so that each EGR cooler experiences at least some higher flow operation during the low flow EGR condition. However, at some engine operating conditions, low flow in one loop may cause build up that it is more difficult to clean or reduce. Thus, the routine, in 720, may select Mode A. In this case, the routine, in 740, adjusts the EGR valves to provide substantially similar amount of EGR flow or valve positions in each EGP loop.

Figure 7A:
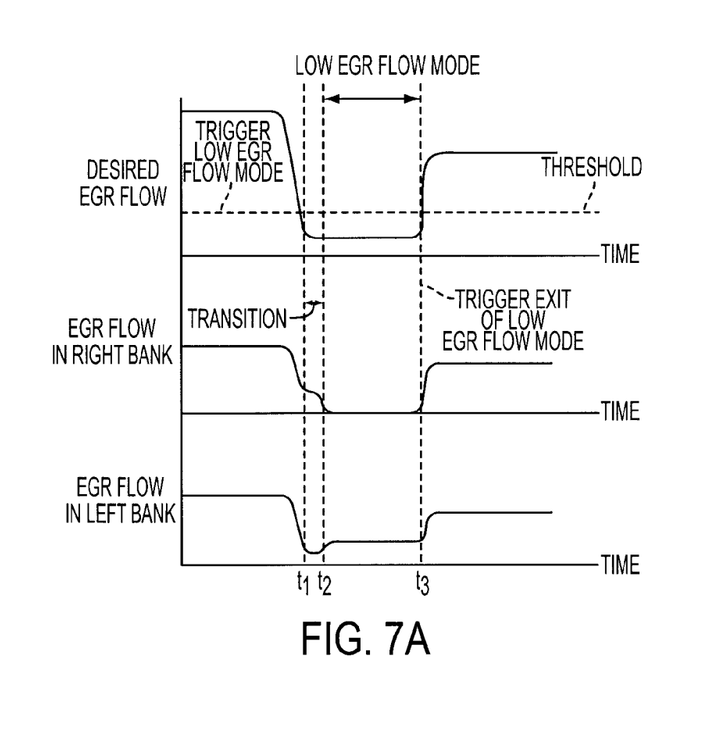
FIGS. 7A and 7B illustrate the changes of EGR flow with time during normal EGR operation and cleaning cycle.
Figure 7B:
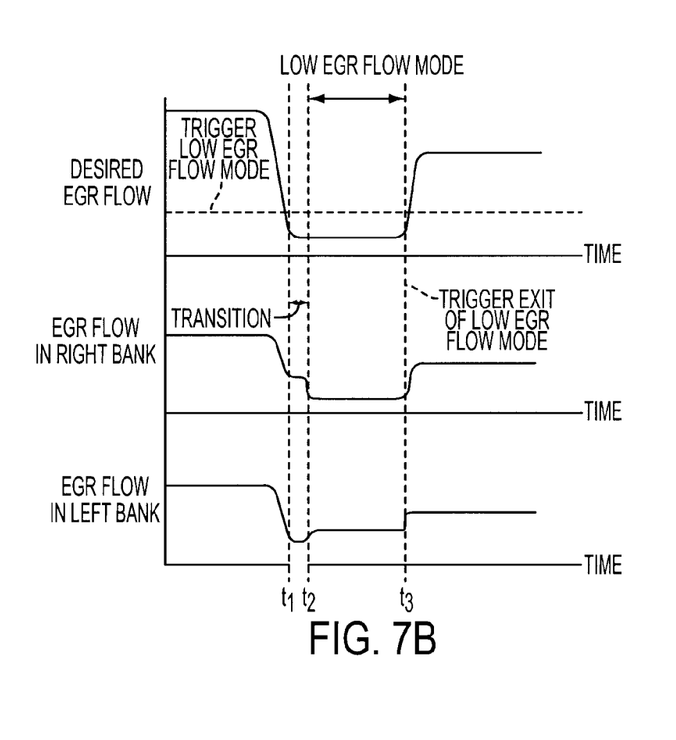

FIGS. 7A and 7B show example changes of EGR flow with time, illustrating the transition of the operation between different EGR operation modes. FIG. 7A shows a mode transition where two loops initially provide desired EGR flow until the flow level falls below a threshold value (dashed horizontal line), at which point the valve are adjusted unequally so that EGR flow in one loop is temporarily stopped until the total EGR flow subsequently increases. Specifically, at t1, total EGR flow falls below a predetermined threshold, thus the low EGR flow mode is triggered. FIG. 7A also indicates a transition period from t1 to t2. At t2, the low EGR flow mode commences. During the period from t2 to t3, the EGR valve in the left bank is adjusted to provide desired flow. At the same time, the EGR valve in right bank is closed, thus the EGR flow in right bank remains substantially zero during period of t2 to t3 (of course, there may be some leakage flow). At t3, the desired EGR flow increases above the threshold, triggering the exit of the low EGR mode. After t3, the previous EGR operation using multiple loops is resumed in which each EGR loop may provide the substantially the same amount of flow.

While FIG. 7A shows the right bank flow being stopped, either bank may be selected to be operated with a closed EGR valve. Further, the loops may alternate between such operations during the period from t2 to t3, for example. Further still, the routine may integrate an amount of operation each loop experiences and select the loop to be deactivated to balance an amount of EGR operation between the loops. Additionally, other parameters may also be used in selecting which loop to temporarily deactivate, when to toggle between the loops, etc.

FIG. 7B shows a mode transition where two loops initially provide desired EGR flow until the flow level falls below a threshold value (dashed horizontal line), at which point the valves are adjusted unequally so that EGR flow in one loop is increased while EGR flow in another loop is decreased until the total EGR flow subsequently increases. The change of EGR flow with time illustrated in FIG. 7B is similar to that in FIG. 7A except that between t2 and t3, the EGR flow in one bank (e.g., the left bank) is increased while the EGR flow in another bank (e.g., the right bank) is decreased. Again, as noted with regard to FIG. 7A, various modifications may be made regarding cycling operation between the loops at different EGR levels, etc.

Figure 8:
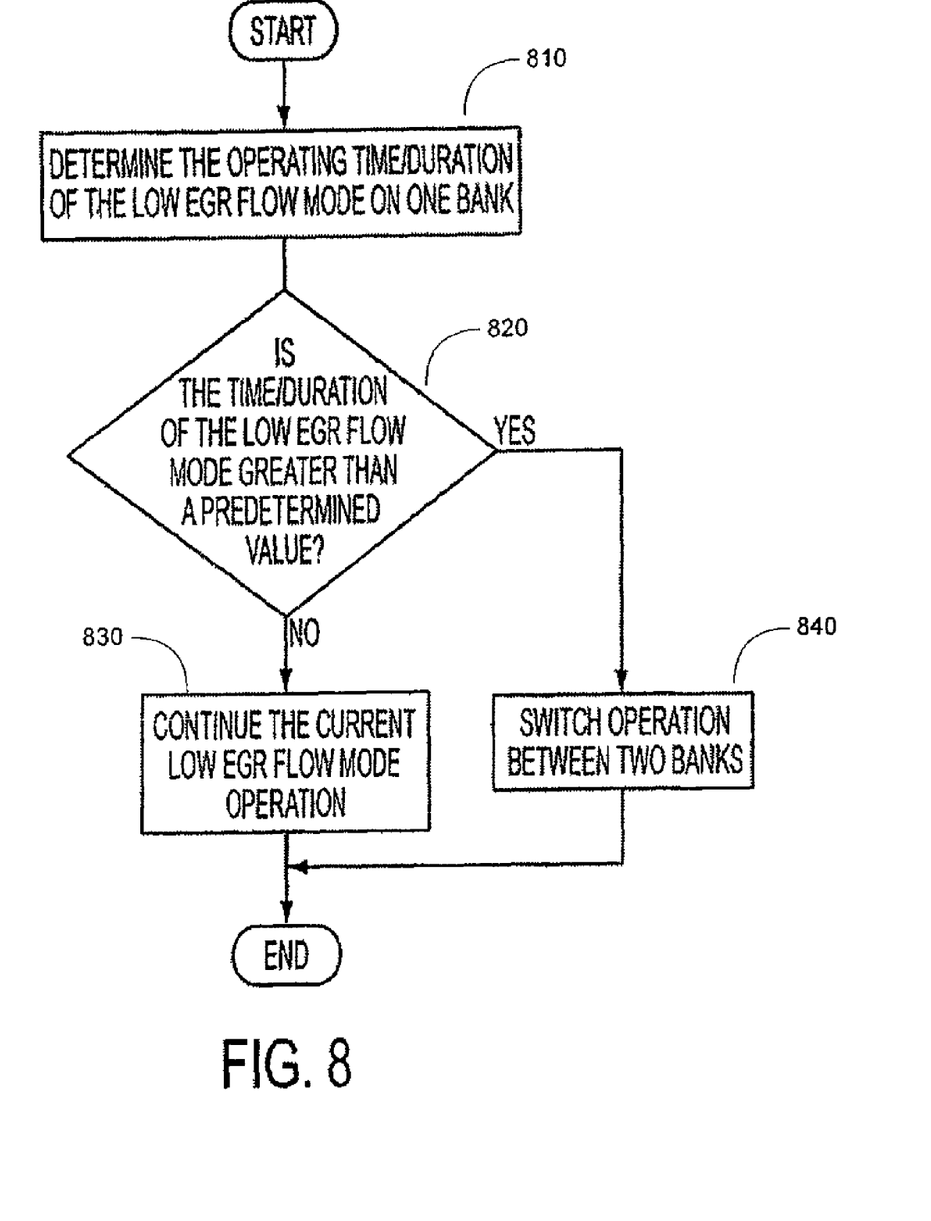
FIG. 8 is a flow diagram illustrating the switching of operation from one EGR bank to another EGR bank.

FIG. 8 is a flow diagram illustrating the toggling of EGR loop operation at low EGR flow mode where two loops or banks are operating with unequal flows.

The routine first determines in 810 the operating time or duration of the low EGR flow mode on one bank. Alternative parameters may also be used, such as an integrated amount of operation scaled with temperature and flow, or others. The low EGR flow compensation may be any of those noted herein, such as Mode B or Mode C for example. Next, the routine, in 820, determines if the time/duration of the low EGR flow mode is greater than a predetermined value. If so, the routine, in 840, switches the operation between two banks. For example, during Mode B operation, if one bank provides all the desired flow in the previous operation, the EGR valve in that bank is closed to provide no flow in the next duration. If the answer is no, the routine, in 830, continues the current low EGR flow operation.

As will be appreciated by one of ordinary skill in the art, the specific routines and block diagrams described above in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a diesel engine having an intake system and an exhaust system;
a first EGR loop coupled between said intake system and said exhaust system and having a first valve and a first cooler located therein;
a second EGR loop coupled between said intake system and said exhaust system and having a second valve and a second cooler located therein; and
a control system operating the first and second valves in a first condition where both valves provide EGR flow to the intake system of the engine, and operating the first and second valve to at least temporarily increase flow in the first EGR loop and decrease flow in the second EGR loop to decrease solid build up in a second condition where EGR flow is decreased.

2. The system of claim 1 wherein said first loop is coupled between an intake manifold and an exhaust manifold of the engine, and said second loop is coupled between said intake manifold and said exhaust manifold of the engine.

3. The system of claim 1 wherein said first loop is coupled on a first bank of the engine and said second loop is coupled on a second bank of the engine.

4. The system of claim 1 wherein said control system further at least temporarily increases flow in the second EGR loop and decreases flow in the first EGR loop in the second condition.

5. The system of claim 4 further comprising a turbocharger coupled to the engine.

6. The system of claim 5 further comprising a common rail fuel injection system coupled to the engine.

7. The system of claim 6 wherein said condition is when EGR flow falls below a threshold value and exhaust temperature is below a threshold temperature value.

8. The system of claim 7 wherein said temporary increase and decrease generates unequal flow amounts between the first and second EGR loop.

9. The system of claim 8 wherein said control system further adjusts engine operation to increase exhaust gas temperature during said temporary increase and decrease.

10. A method of operating an engine having a first exhaust gas recirculation loop and second exhaust gas recirculation loop, the loops having respectively a first and second valve located therein and a first and second cooler located therein, the method comprising:
during a first condition, operating with both the first and second valves providing at least some flow; and
during a second condition, operating with the first valve providing more flow to the first cooler than during said first condition and the second valve providing less flow to the second cooler than during said first condition,
wherein said second condition reduces a build up of a solid in at least the first cooler.

11. The method of claim 10 wherein said second condition reduces a build up of a solid in the second cooler due to a reduced amount of solid materials introduced to the second loop.

12. The method of claim 11 wherein during said second condition, said second valve is closed such that a build up of the solid in the first cooler is reduced due to increased flow velocity in the first cooler and a build up of the solid in the second cooler is reduced due to no flow in the second loop.

13. The method of claim 10 wherein during said second condition, said second valve is at least partially open.

14. The method of claim 10 wherein a total exhaust gas recirculation flow provided during said first and second condition are substantially equal.

15. The method of claim 14 wherein during said second condition, said first valve is adjusted to provide a desired exhaust gas recirculation amount to the engine.

16. The method of claim 10 further comprising during a third condition, operating with the first valve providing less flow to the first cooler than during said first condition and the second valve providing more flow to the second cooler than during said first condition.

17. The method of claim 16 wherein a total exhaust gas recirculation flow provided during said first, second, and third condition are substantially equal.

18. A method of operating an engine having a first exhaust gas recirculation loop and second exhaust gas recirculation loop, the loops having respectively a first and second valve located therein and a first and second cooler located therein, the method comprising:
during a first condition, operating with both the first and second valves providing at least some flow;
during a second condition, operating with the first valve providing more flow to the first cooler than during said first condition and the second valve closed; and
during a third condition, operating with the first valve closed and the second valve providing more flow to the second cooler than during said first condition,
wherein said second condition and third condition reduce a build up of a solid in the first cooler and second cooler.

* * * * *